(12) United States Patent
Petrich et al.

(10) Patent No.: US 9,618,998 B2
(45) Date of Patent: Apr. 11, 2017

(54) IDENTIFICATION OF IDLE SERVERS USING POWER CONSUMPTION

(71) Applicant: International Business Machines Corporation, Armonk, NY (US)

(72) Inventors: Michael P. Petrich, Rochester, MN (US); Joseph F. Prisco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 14/735,293

(22) Filed: Jun. 10, 2015

(65) Prior Publication Data
US 2016/0363984 A1 Dec. 15, 2016

(51) Int. Cl.
*G06F 1/00* (2006.01)
*G06F 1/32* (2006.01)

(52) U.S. Cl.
CPC .......... *G06F 1/3206* (2013.01); *G06F 1/3209* (2013.01); *G06F 1/3287* (2013.01)

(58) Field of Classification Search
CPC ..... G06F 1/3206; G06F 1/3209; G06F 1/3287
USPC .................. 709/223; 713/340, 300, 320, 322
See application file for complete search history.

(56) References Cited

U.S. PATENT DOCUMENTS

| | | | |
|---|---|---|---|
| 7,103,874 B2 | 9/2006 | McCollum et al. | |
| 7,844,686 B1 | 11/2010 | Keith, Jr. | |
| 8,307,239 B1 | 11/2012 | Keith, Jr. | |
| 8,631,411 B1 | 1/2014 | Ghose | |
| 8,776,075 B2* | 7/2014 | Cosentino | G06F 1/206 709/223 |
| 2005/0223257 A1* | 10/2005 | Watts, Jr. | G06F 1/206 713/322 |
| 2006/0259793 A1* | 11/2006 | Moore | G06F 1/206 713/300 |
| 2007/0032908 A1* | 2/2007 | Hyland | H05K 7/20836 700/275 |
| 2009/0177907 A1* | 7/2009 | Sotomayor, Jr. | G06F 1/3203 713/340 |

(Continued)

OTHER PUBLICATIONS

Abdelsalam et al., "Analysis of Energy Efficiency in Clouds," 2009 Computation World: Future Computing, Service Computation, Cognitive, Adaptive, Content, Patterns, HPCA 2008, IEEE 14th International Symposium, 978-0/7695-3862-4/09, © 2009 IEEE, DOI 10.1109/ComputationWorld.2009.38, pp. 416-421.

(Continued)

*Primary Examiner* — Aurel Prifti
(74) *Attorney, Agent, or Firm* — Daniel C. Housley

(57) ABSTRACT

Power consumption data for a server and temperature data from a location containing the server are received. It is determined that variation in the power consumption data exceeds a first threshold level. It is determined, in response to determining variation in the power consumption data exceeds the first threshold level, variation in the temperature data does not exceed a second threshold level. It is determined, in response to determining variation in the temperature data does not exceed a second threshold level, variation in the power consumption data follows a cyclic pattern. The server is identified as idle in response to determining the variation in the power consumption data follows the cyclic pattern.

20 Claims, 7 Drawing Sheets

(56) References Cited

U.S. PATENT DOCUMENTS

| | | | |
|---|---|---|---|
| 2011/0161685 A1* | 6/2011 | Lin | G06F 1/206 |
| | | | 713/300 |
| 2012/0158206 A1* | 6/2012 | Longobardi | G05B 13/048 |
| | | | 700/300 |
| 2013/0191676 A1* | 7/2013 | Mase | G06F 1/28 |
| | | | 713/340 |
| 2015/0143142 A1* | 5/2015 | Park | G06F 1/324 |
| | | | 713/320 |
| 2015/0346798 A1* | 12/2015 | Dongara | G06F 1/3206 |
| | | | 713/320 |

OTHER PUBLICATIONS

Kaushik et al., "GreenHDFS: Towards an Energy-Conserving, Storage-Efficient, Hybrid Hadoop Compute Cluster," Proceedings of the USENIX Annual Technical Conference, 2010, 5 pages.

Mukherjee et al., "Model-driven Co-ordianted Management of Data Centers," Computer Networks 54.16 (2010): 2869-2886. 25 pages.

Sharma et al., "Balance of Power Dynamic Thermal Management for Internet Data Centers," IEEE Internet Computing, Jan.-Feb., 2005, 1089-7801/05 © 2005 IEEE, pp. 42-49.

Wang, et al., "Cluster-level Feedback Power Control for Performance Optimization," High Performance Computer Architecture, 2008, HPCA 2008, IEEE 14th International Symposium on IEEE, 978-1-4244-2070-4/08, © 2008 IEEE, pp. 101-110.

\* cited by examiner

IDENTIFICATION OF IDLE SERVERS USING POWER CONSUMPTION

BACKGROUND

The present disclosure relates to computer servers, and more specifically to identification of idle servers.

Data centers are facilities used to house computer systems and associated components. Servers in a data center perform work for client systems, such as running jobs, executing specific tasks, or performing arithmetic calculations. Servers that are idle (i.e. not performing useful work) still use energy. The wasteful use of energy on idle servers can be prevented by identifying and removing the idle servers.

SUMMARY

According to embodiments of the present disclosure, a method for identifying idle servers is disclosed. The method includes receiving power consumption data, for a server, for a period of time and receiving temperature data, for the period of time, from a location containing the server. It is determined that variation in the power consumption data exceeds a first threshold level. It is determined, in response to determining variation in the power consumption data exceeds the first threshold level, variation in the temperature data does not exceed a second threshold level. It is determined, in response to determining variation in the temperature data does not exceed a second threshold level, variation in the power consumption data follows a cyclic pattern. The server is identified as idle in response to determining the variation in the power consumption data follows the cyclic pattern.

Further disclosed herein are embodiments of a system and a computer program product for performing the disclosed method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
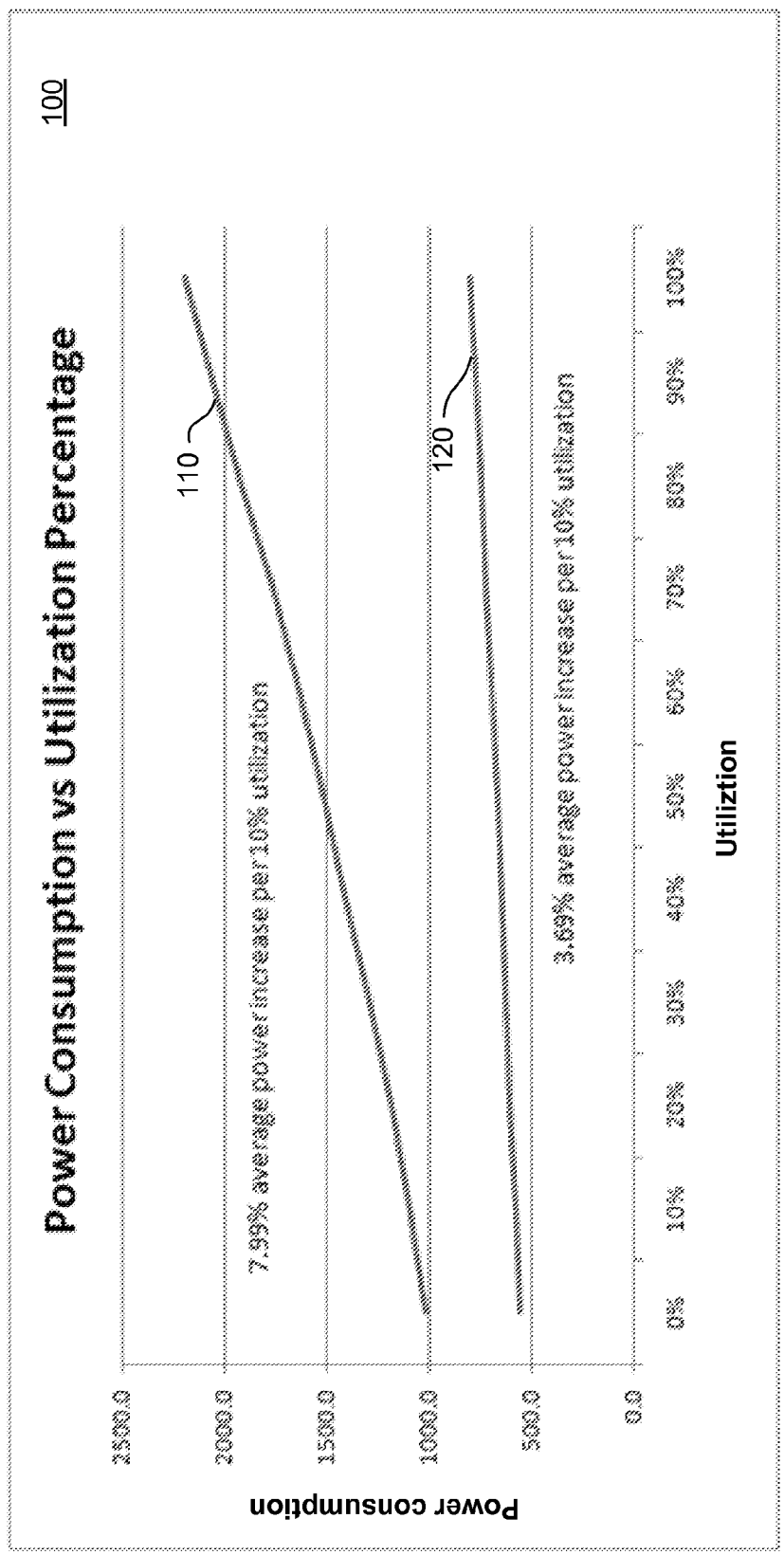
FIG. 1 depicts a graph of power consumption versus utilization for two example servers.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to identifying idle servers based on power consumption, and more particular aspects relate to identifying idle servers based on correlation of power consumption to temperature and cyclic idle processes. While the present disclosure is not necessarily limited to such applications, various aspects of the disclosure may be appreciated through a discussion of various examples using this context.

Power consumption of a server increases with workload. Thus, low constant power consumption by a server may indicate an idle server. Referring to FIG. 1, a graph 100 of power consumption versus utilization for two example servers is depicted. Line 110 represents a first example server and line 120 represents a second example server. As depicted, power consumption for the first and second server increase with utilization. The first example server, represented by line 110, increases its power consumption by an average of 7.99% for each 10% increase in utilization. The second example server, represented by line 120, increases its power consumption by an average of 3.69% for each 10% increase in utilization. Thus, as depicted in FIG. 1, increased power consumption by a server may indicate increased utilization of the server.

Figure 2:
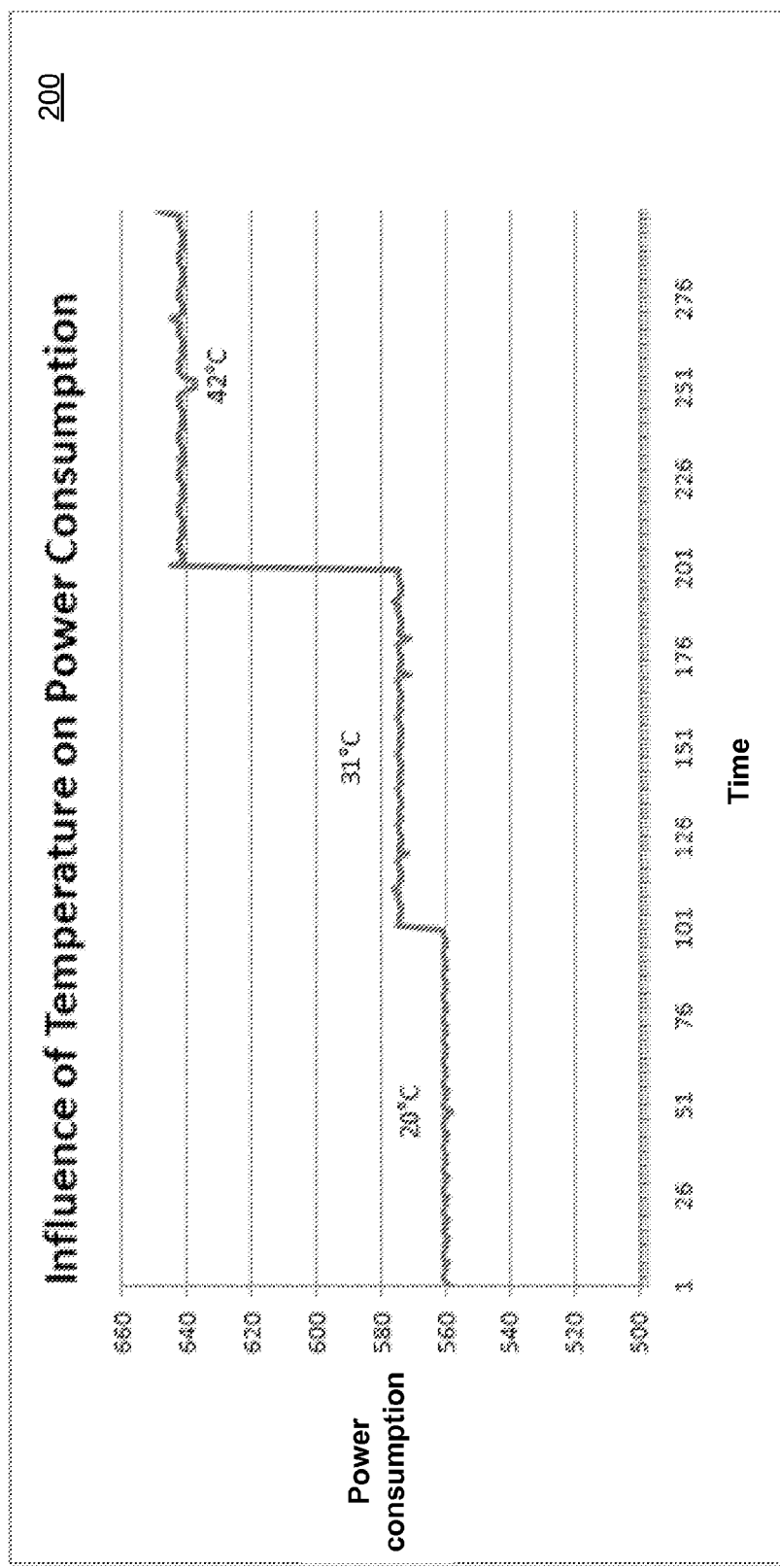
FIG. 2 depicts a graph of power consumption over time of an example server at three different temperatures.

However, temperature can also affect power consumption by a server as it can affect fan usage and fan speed for the server. Referring to FIG. 2, a graph 200 of power consumption over time of an example server at three different temperatures is depicted. As depicted, power consumption increases with increased temperature. Graph 200 shows power consumption of an example server at 20° C., 31° C., and 42° C. Thus, as shown, a change in power consumption by a server may be due to a change in inlet temperature at the server.

Figure 3:
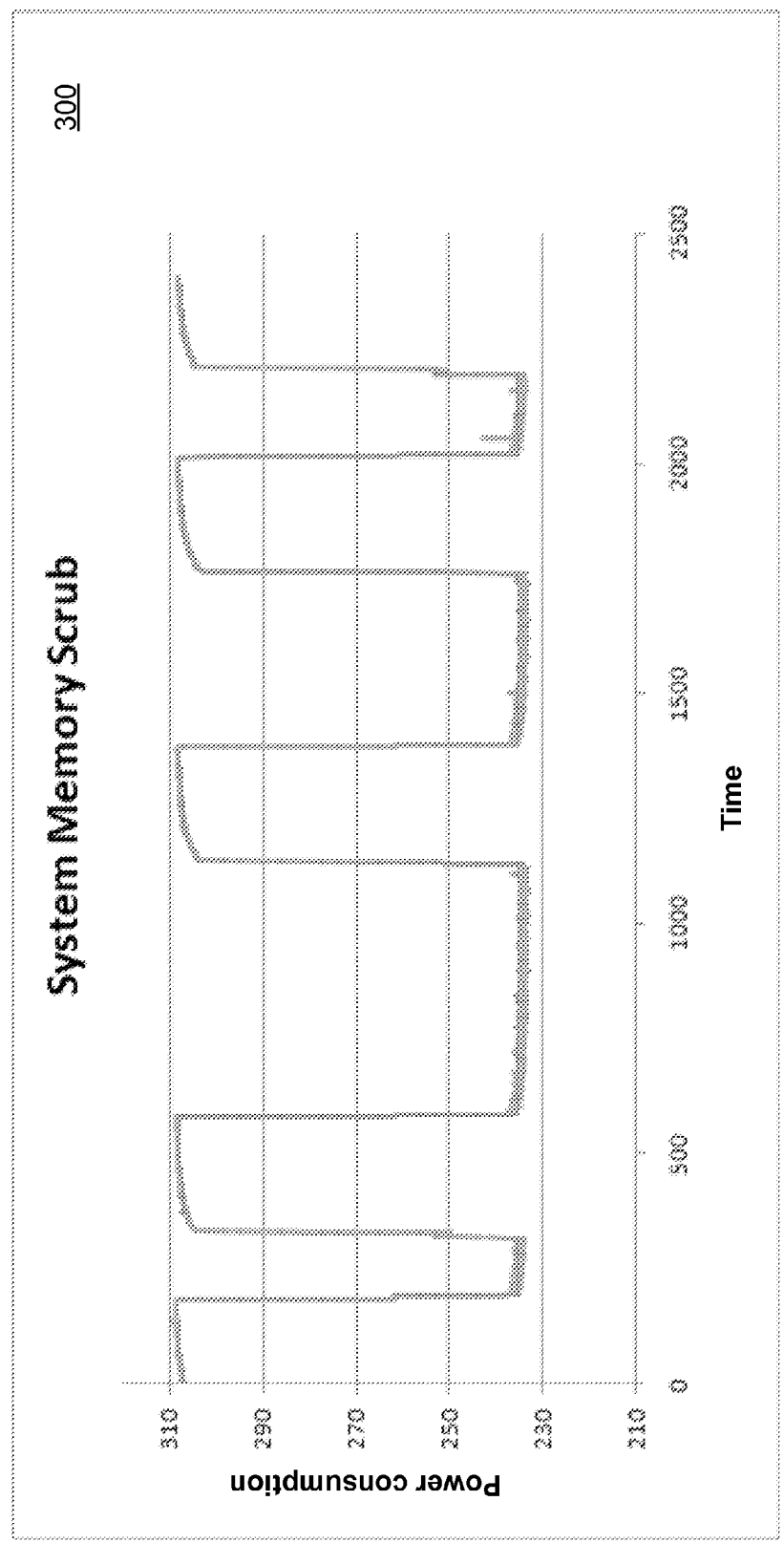
FIG. 3 depicts graph of power consumption over time for a server performing a system memory scrub.
Figure 4:
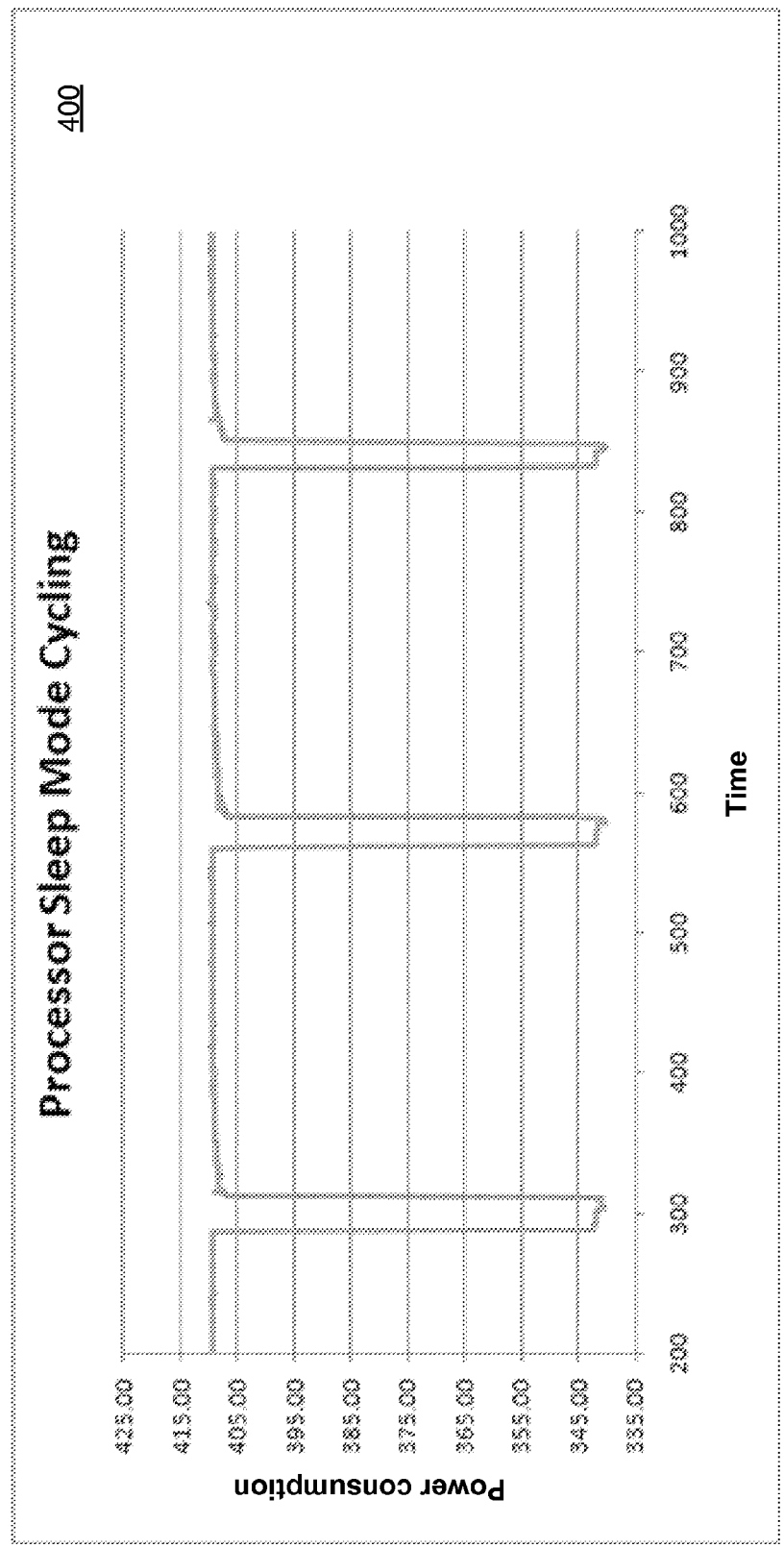
FIG. 4 depicts a graph of power consumption over time for a server going through processor sleep mode cycling.

Further, servers may perform background processes, not associated with work for a client system, which may cause fluctuations in power consumption of an idle server. FIG. 3 and FIG. 4 depict power consumption of a server performing example background processes. Background processes running on an idle server, such as those depicted in FIG. 3 and FIG. 4, result in a cyclic pattern of power consumption for the server.

Referring to FIG. 3, a graph of power consumption over time for a server performing a system memory scrub is depicted. Memory scrubbing consists of reading from each memory location, correcting bit errors with an error-correcting code (ECC), and writing the corrected data back to the same location. When the server is executing the system memory scrub, the power consumption increases to a higher level. When the server is not executing the system memory scrub, the power consumption returns to a lower baseline level. There is pattern of power consumption over time where the power consumption quickly transitions between the lower baseline level and the higher level.

Referring to FIG. 4, a graph 400 of power consumption over time for a server going through processor sleep mode cycling is depicted. As the server goes in and out of sleep mode the power consumption cycles between a lower power sleep state and a higher power non-sleep state.

Embodiments of the present disclosure may provide for identifying idle servers using power consumption and temperature data over time. Power meters may measure power consumption for each server in a data center and communicate the power consumption data to an idle server identification module. One or more temperature sensors in the data center may measure the temperature in the data center and communicate the temperature data to the idle server identification module. The idle server identification module may be configured to monitor the power consumption data and temperature data over a period of time to determine if a server is idle. The idle server identification module may be configured to identify idles servers using the method described below in reference to FIG. 5.

Figure 5:
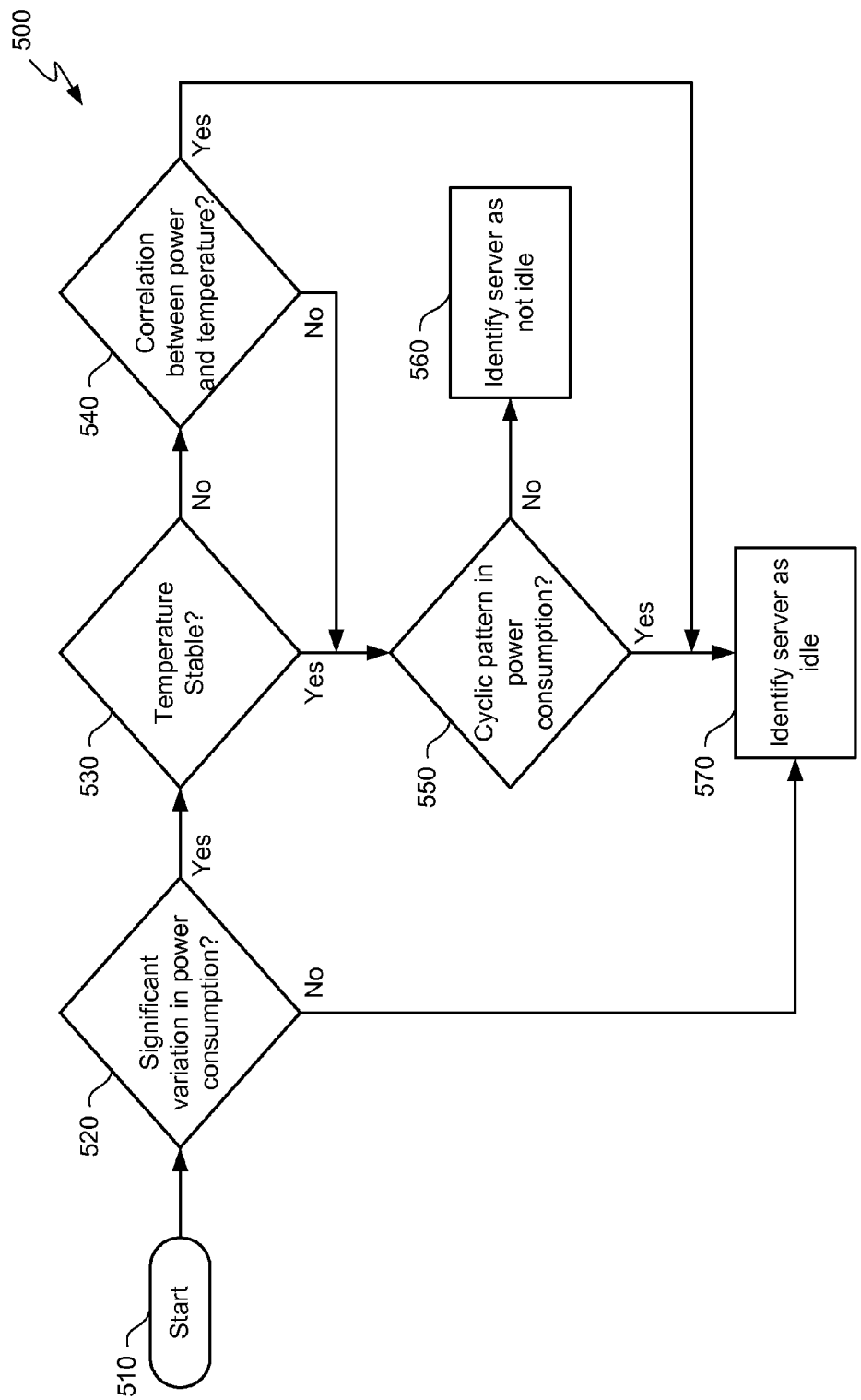
FIG. 5 depicts a flow diagram of an example method for identifying idle servers using power consumption and temperature data.

Referring to FIG. 5, a flow diagram of an example method 500 for identifying idle servers using power consumption and temperature data is depicted. Method 500 begins at block 510. At block 520, it is determined whether there is a significant variation in power consumption by a server over a period of time. In some embodiments, determining whether there is a significant variation in power consumption includes determining whether variation in power consumption exceeded a threshold level. For example, the threshold may be 1% of the lowest measured power. The threshold level may be set at a level such that small variations in power consumption that indicate an idle server fall below the threshold level. If the variation in power consumption is not significant, the server is identified as idle at block 570.

If the variation in power consumption is significant, it is determined, at block 530, whether the inlet temperature at the server has remained stable over the period of time. In some embodiments, the temperature is considered stable if its variation is less than a threshold level. For example, the temperature may be considered stable if the variation in temperature is less than 2° C. The threshold temperature may be set at a level such that temperature variations below the threshold are unlikely to cause a significant change in power consumption by the server.

If the temperature is not stable, it is determined, at block 540, whether there is a correlation between the power consumption of the server and temperature around the server. As depicted in FIG. 2, an increase in temperature can cause an increase in power consumption and a decrease in power consumption can cause a decrease in power consumption. If the power consumption variations correlate with variations in temperature, the server is identified as idle at block 570.

If, at block 530, it is determined that the temperature around the server is stable or, at block 540, it is determined that at least some variations in power consumption do not correlate with variations in temperature, it is determined whether the variations in power consumption follow a cyclic pattern indicative of a background process at block 550. A cyclic pattern indicative of a background process may include the power consumption cyclically transitioning between a higher level and a lower level of power consumption. Examples of cyclic patterns indicative of a background process are shown in FIG. 3 (system memory scrub) and FIG. 4 (processor sleep mode cycling). If there is not a cyclic pattern in the power consumption, the server is identified as not idle at block 560. If there is a cyclic pattern in the power consumption, the server is identified as idle at block 570.

Identifying the server as idle in block 570 may be performed in many ways. In some embodiments, a data structure indicating the status of one or more servers is modified to indicate that the server is idle. This data structure may be accessed by users to identify idle servers. In some embodiments, a notification is communicated to a user indicating that the server is idle. This communication could take many forms. For example, a window with the notification may be displayed in a graphical user interface on a display device, such as a monitor, attached to the computing device that identified the idle server or another computing device. In another example, an email or other electronic message with the notification may be sent to a user.

Figure 6:
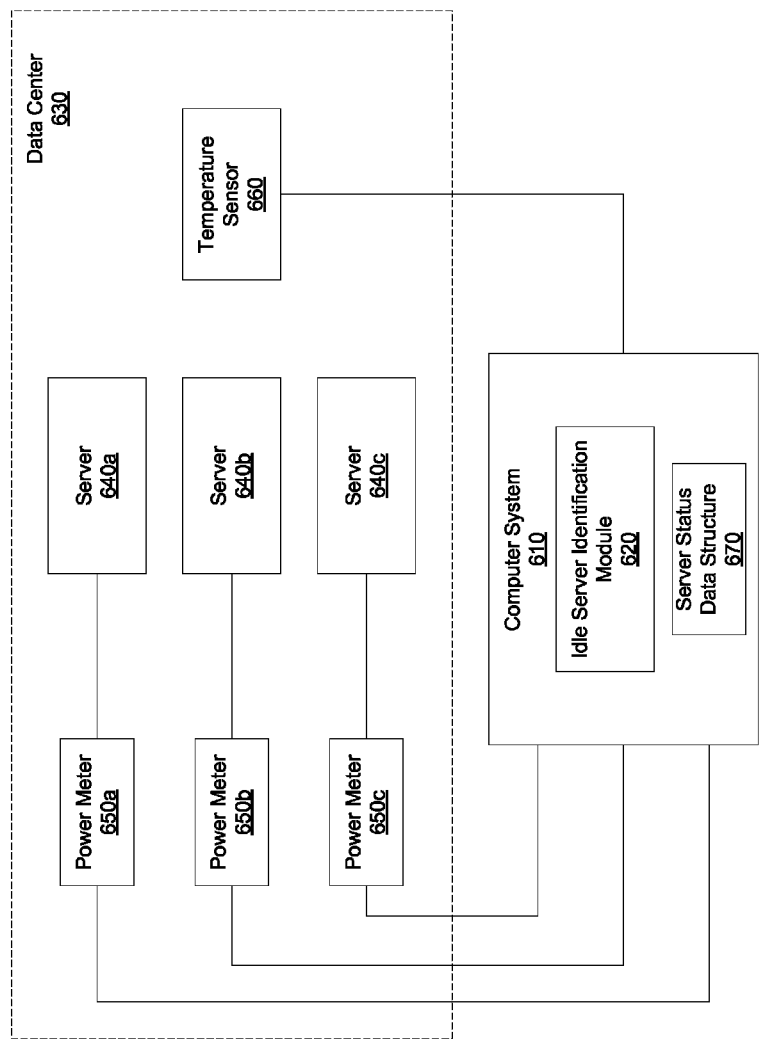
FIG. 6 depicts a block diagram of an example system for identifying idle servers using power consumption data and temperature data.

Referring to FIG. 6, a block diagram of an example system for identifying idle servers using power consumption data and temperature data is depicted. As depicted, data center 630 contains server 640a, server 640b, and server 640c (collectively 640). Data center 630 further contains power meter 650a, power meter 650b, and power meter 650c (collectively 650). Power meter 650a is configured to monitor power consumption of server 640a, power meter 650b is configured to monitor power consumption of server 640b, and power meter 650c is configured to monitor power consumption of server 640c. Power meters 650 are further configured to communicate power consumption data from servers 640 to computer system 610. Power meters 650 may be any device capable of monitoring power consumption of a server. Data center 630 further contains a temperature sensor 660. Temperature sensor 660 is configured to monitor the temperature within data center 630 and transmit the temperature data to computer system 610.

Computer system 610 contains idle server identification module 620. Idle server identification module 620 may identify servers which are idle using the power consumption data and temperature data. Idle server identification module may be configured to perform method 500 described in reference to FIG. 5. In some embodiments, computer system 610 may further contain a server status data structure 670 that identifies the status, such as idle or not idle, for servers 640. Idle server identification module 620 may be configured to modify server status data structure 670 to indicate a server is idle when the server is identified as idle. Data structure 670 may be any type of data structure capable of storing this information. In some embodiments, computer system 610 may be associated with a display for displaying a notification to a user indicating an idle server.

Although computer system 610 is depicted outside of data center 630, in some embodiments, computer system 610 may be within data center 630. Computer system 610 may be any type of computing system. Computer system 610 may be connected directly to power meters 650 and temperature sensor 660 or may be connected remotely over one or more networks. The networks can include, but are not limited to, local area networks, point-to-point communications, wide area networks, the global Internet, or combinations thereof.

In some embodiments, computer system 610 may be further configured to turn off power to a server in response to identifying a server as idle. This may involve activating a switch or otherwise disrupting the supply of power to the server.

Figure 7:
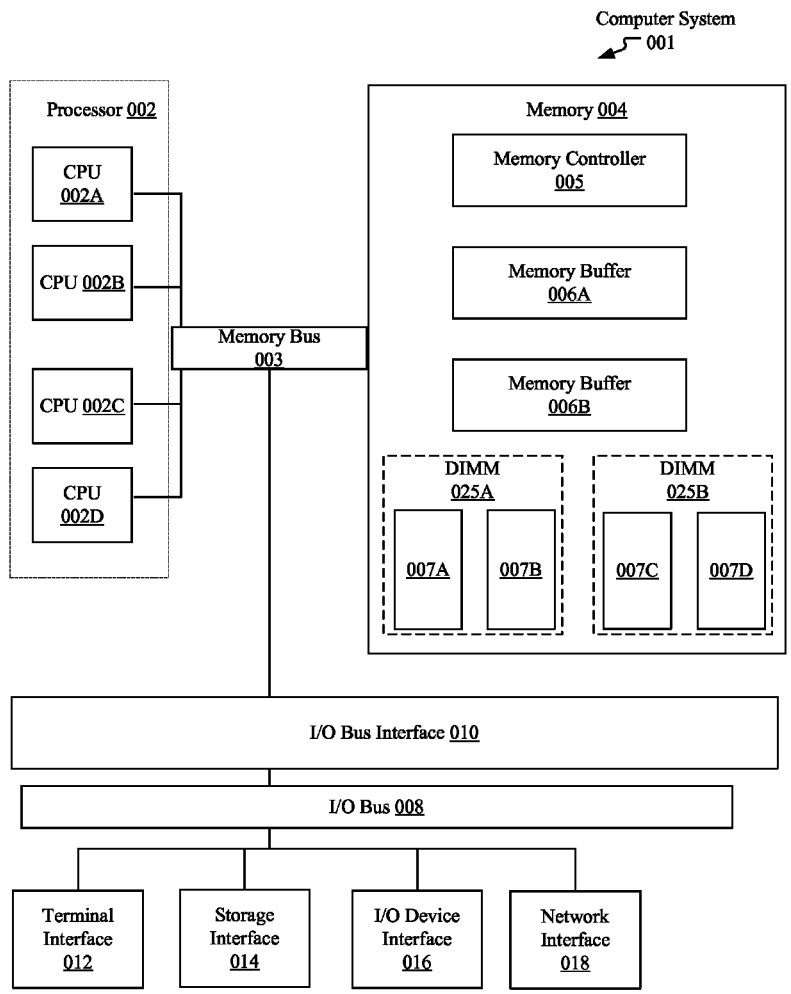
FIG. 7 depicts a high-level block diagram of an example computer system that may be used in implementing one or more of the methods, tools, and modules, and any related functions or operations described herein, in accordance with embodiments of the present disclosure.

Referring now to FIG. 7, shown is a high-level block diagram of an example computer system (i.e., computer) 001 that may be used in implementing one or more of the methods, tools, and modules, and any related functions or operations, described herein (e.g., using one or more processor circuits or computer processors of the computer), in accordance with embodiments of the present disclosure. For example, computer system 001 may be used to implement computer system 610 described in reference to FIG. 6. In some embodiments, the major components of the computer system 001 may comprise one or more CPUs 002, a memory subsystem 004, a terminal interface 012, a storage interface 014, an I/O (Input/Output) device interface 016, and a network interface 018, all of which may be communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In some embodiments, the computer system 001 may contain multiple processors typical of a relatively large system; however, in other embodiments the computer system 001 may alternatively be a single CPU system. Each CPU 002 may execute instructions stored in the memory subsystem 004 and may comprise one or more levels of on-board cache.

In some embodiments, the memory subsystem 004 may comprise a random-access semiconductor memory, storage device, or storage medium (either volatile or non-volatile) for storing data and programs. In some embodiments, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but, in some embodiments, the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 004 may contain elements for control and flow of memory used by the CPU 002. This may include all or a portion of the following: a memory controller 005, one or more memory buffers 006A and 006B and one or more memory devices 025A and 025B. In some embodiments, the memory devices 025A and 025B may be dual in-line memory modules (DIMMs), which are a series of dynamic random-access memory (DRAM) chips 007A-007D (collectively referred to as 007) mounted on a printed circuit board and designed for use in personal computers, workstations, and servers. The use of DRAMs 007 in the illustration is exemplary only and the memory array used may vary in type as previously mentioned.

Although the memory bus 003 is shown in FIG. 7 as a single bus structure providing a direct communication path among the CPUs 002, the memory subsystem 004, and the I/O bus interface 010, the memory bus 003 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in some embodiments, contain multiple I/O bus interface units 010, multiple I/O buses 008, or both. Further, while multiple I/O interface units are shown, which separate the I/O bus 008 from various communications paths running to the various I/O devices, in other embodiments some or all of the I/O devices may be connected directly to one or more system I/O buses.

In some embodiments, the computer system 001 may be a multi-user mainframe computer system, a single-user system, or a server computer or similar device that has little or no direct user interface, but receives requests from other computer systems (clients). Further, in some embodiments, the computer system 001 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 001. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for identifying idle servers, the method comprising:
  receiving power consumption data, for a server, for a period of time;
  receiving temperature data, for the period of time, from a location containing the server;
  determining variation in the power consumption data exceeds a first threshold level;
  determining, in response to the determining variation in the power consumption data exceeds the first threshold level, variation in the temperature data does not exceed a second threshold level;
  determining, in response to the determining variation in the temperature data does not exceed a second threshold level, variation in the power consumption data follows a cyclic pattern; and
  identifying the server as idle in response to the determining the variation in the power consumption data follows the cyclic pattern.

2. The method of claim 1, further comprising:
  receiving second power consumption data, for a second server, for a second period of time;
  receiving second temperature data, for the second period of time, from a location containing the second server;
  determining variation in the second power consumption data exceeds the first threshold level;
  determining, in response to the determining variation in the second power consumption data exceeds the first threshold level, variation in the second temperature data exceeds the second threshold level;
  determining the variation in the second power consumption data correlates to the variation in the second temperature data; and
  identifying the second server as idle in response to the determining the variation in the second power consumption data correlates to the variation in the second temperature data.

3. The method of claim 1, further comprising:
- receiving second power consumption data, for a second server, for a second period of time;
- receiving second temperature data, for the second period of time, from a location containing the second server;
- determining variation in the second power consumption data exceeds the first threshold level;
- determining variation in the second temperature data exceeds the second threshold level;
- determining the variation in the second power consumption data does not correlate to the variation in the second temperature data;
- determining the variation in the second power consumption data follows a cyclic pattern; and
- identifying the second server as idle in response to the determining the variation in the second power consumption data follows a cyclic pattern.

4. The method of claim 1, wherein the identifying the server as idle comprises modifying a data structure to indicate that the server is idle, the data structure indicating status for one or more servers.

5. The method of claim 1, wherein the identifying the server as idle comprises communicating a notification to a user, the notification indicating that the server is idle.

6. The method of claim 5, wherein the communicating the notification to the user comprises displaying the notification to the user.

7. The method of claim 1, wherein the determining the variation in the power consumption data follows a cyclic pattern comprises:
- determining the power consumption cyclically transitions between a lower level of power consumption and a higher level of power consumption.

8. The method of claim 1, further comprising:
- removing power to the server in response to identifying the server as idle.

9. A system for identifying idle servers, the system comprising:
- a processor; and
- a non-transitory computer readable storage medium having program instructions embodied therewith, the program instructions executable by the processor to cause the system to perform a method comprising:
  - receiving power consumption data, for a server, for a period of time;
  - receiving temperature data, for the period of time, from a location containing the server;
  - determining variation in the power consumption data exceeds a first threshold level;
  - determining, in response to the determining variation in the power consumption data exceeds the first threshold level, variation in the temperature data does not exceed a second threshold level;
  - determining, in response to the determining variation in the temperature data does not exceed a second threshold level, variation in the power consumption data follows a cyclic pattern; and
  - identifying the server as idle in response to the determining the variation in the power consumption data follows the cyclic pattern.

10. The system of claim 9, wherein the method further comprises:
- receiving second power consumption data, for a second server, for a second period of time;
- receiving second temperature data, for the second period of time, from a location containing the second server;
- determining variation in the second power consumption data exceeds the first threshold level;
- determining, in response to the determining variation in the second power consumption data exceeds the first threshold level, variation in the second temperature data exceeds the second threshold level;
- determining the variation in the second power consumption data correlates to the variation in the second temperature data; and
- identifying the second server as idle in response to the determining the variation in the second power consumption data correlates to the variation in the second temperature data.

11. The system of claim 9, wherein the method further comprises:
- receiving second power consumption data, for a second server, for a second period of time;
- receiving second temperature data, for the second period of time, from a location containing the second server;
- determining variation in the second power consumption data exceeds the first threshold level;
- determining variation in the second temperature data exceeds the second threshold level;
- determining the variation in the second power consumption data does not correlate to the variation in the second temperature data;
- determining the variation in the second power consumption data follows a cyclic pattern; and
- identifying the second server as idle in response to the determining the variation in the second power consumption data follows a cyclic pattern.

12. The system of claim 9, wherein the identifying the server as idle comprises communicating a notification to a user, the notification indicating that the server is idle.

13. The system of claim 12, wherein the communicating the notification to the user comprises displaying the notification to the user.

14. The system of claim 9, wherein the method further comprises:
- removing power to the server in response to identifying the server as idle.

15. A computer program product for identifying idle servers, the computer program product comprising a non-transitory computer readable storage medium having program instructions embodied therewith, the program instructions executable by a computer to cause the computer to perform a method comprising:
- receiving power consumption data, for a server, for a period of time;
- receiving temperature data, for the period of time, from a location containing the server;
- determining variation in the power consumption data exceeds a first threshold level;
- determining, in response to the determining variation in the power consumption data exceeds the first threshold level, variation in the temperature data does not exceed a second threshold level;
- determining, in response to the determining variation in the temperature data does not exceed a second threshold level, variation in the power consumption data follows a cyclic pattern; and
- identifying the server as idle in response to the determining the variation in the power consumption data follows the cyclic pattern.

16. The computer program product of claim 15, wherein the method further comprises:

receiving second power consumption data, for a second server, for a second period of time;
receiving second temperature data, for the second period of time, from a location containing the second server;
determining variation in the second power consumption data exceeds the first threshold level;
determining, in response to the determining variation in the second power consumption data exceeds the first threshold level, variation in the second temperature data exceeds the second threshold level;
determining the variation in the second power consumption data correlates to the variation in the second temperature data; and
identifying the second server as idle in response to the determining the variation in the second power consumption data correlates to the variation in the second temperature data.

17. The computer program product of claim 15, wherein the method further comprises:
receiving second power consumption data, for a second server, for a second period of time;
receiving second temperature data, for the second period of time, from a location containing the second server;
determining variation in the second power consumption data exceeds the first threshold level;
determining variation in the second temperature data exceeds the second threshold level;
determining the variation in the second power consumption data does not correlate to the variation in the second temperature data;
determining the variation in the second power consumption data follows a cyclic pattern; and
identifying the second server as idle in response to the determining the variation in the second power consumption data follows a cyclic pattern.

18. The computer program product of claim 15, wherein the identifying the server as idle comprises communicating a notification to a user, the notification indicating that the server is idle.

19. The computer program product of claim 18, wherein the communicating the notification to the user comprises displaying the notification to the user.

20. The computer program product of claim 15, wherein the method further comprises:
removing power to the server in response to identifying the server as idle.

* * * * *